(12) United States Patent
Lee et al.

(10) Patent No.: US 11,678,364 B2
(45) Date of Patent: *Jun. 13, 2023

(54) HALF-DUPLEX OPERATION IN DUAL CONNECTIVITY

(71) Applicant: QUALCOMM Incorporated, San Diego, CA (US)

(72) Inventors: Heechoon Lee, San Diego, CA (US); Peter Gaal, San Diego, CA (US); Wanshi Chen, San Diego, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/714,854

(22) Filed: Apr. 6, 2022

(65) Prior Publication Data

US 2022/0295506 A1 Sep. 15, 2022

Related U.S. Application Data

(63) Continuation of application No. 16/736,640, filed on Jan. 7, 2020, now Pat. No. 11,330,604.

(Continued)

(51) Int. Cl.
*H04W 72/10* (2009.01)
*H04W 72/56* (2023.01)
(Continued)

(52) U.S. Cl.
CPC .......... *H04W 72/56* (2023.01); *H04L 5/1469* (2013.01); *H04L 5/16* (2013.01); *H04W 72/0446* (2013.01); *H04W 72/23* (2023.01); *H04W 76/16* (2018.02)

(58) Field of Classification Search
CPC ... H04W 72/10; H04W 76/16; H04W 72/042; H04W 72/0446; H04W 72/56; H04W 72/23; H04L 5/1469; H04L 5/16
(Continued)

(56) References Cited

U.S. PATENT DOCUMENTS

2012/0257568 A1  10/2012  Cai et al.
2016/0100400 A1   4/2016  Lu et al.
(Continued)

OTHER PUBLICATIONS

CATT: "Coexistence of NR Sidelink and LTE Sidelink in V2X", 3GPP Draft, R1-1808407, 3rd Generation Partnership Project (3GPP), Mobile Competence Centre ; 650, Route Des Lucioles ; F-06921 Sophia-Antipolis Cedex, France, vol. RAN WG1, No. Gothenburg, Sweden, Aug. 20, 2018-Aug. 24, 2018, Aug. 11, 2018 (Aug. 11, 2018), XP051515789, 5 pages, Retrieved from the Internet: URL: http://www.3gpp.org/ftp/tsg%5Fran/WG1%5FRL1/TSGR1%5F94/Docs/R1%2D1808407%2Ezip. [retrieved on Aug. 11, 2018] chapter 3.3, chapter 3.4, chapter 3.5.

(Continued)

*Primary Examiner* — Obaidul Huq
(74) *Attorney, Agent, or Firm* — Holland & Hart LLP

(57) ABSTRACT

Methods, systems, and devices for wireless communications are described. A user equipment (UE) may receive a first slot format configuration for a first cell associated with a first radio access technology (RAT) and a first radio frequency spectrum band that conflicts with a second slot format configuration for a second cell associated with a second RAT and a second radio frequency spectrum band during at least a portion of a transmission time interval (TTI). The UE may determine that the first cell has a priority over the second cell, based on the configured slot formats or based on the radio frequency bands, and may drop a communication on the second cell based on the identified priority. The UE may (Continued)

then communicate during at least a portion of the TTI on the first cell while the UE drops a communication on the second cell.

30 Claims, 10 Drawing Sheets

Related U.S. Application Data

(60) Provisional application No. 62/790,383, filed on Jan. 9, 2019.

(51) Int. Cl.
 *H04L 5/16* (2006.01)
 *H04W 76/16* (2018.01)
 *H04L 5/14* (2006.01)
 *H04W 72/0446* (2023.01)
 *H04W 72/23* (2023.01)

(58) Field of Classification Search
 USPC .................................. 370/276, 277, 280
 See application file for complete search history.

(56) References Cited

U.S. PATENT DOCUMENTS

| | | | |
|---|---|---|---|
| 2016/0234835 A1 | 8/2016 | Yerramalli et al. | |
| 2018/0270039 A1* | 9/2018 | Zhang | .............. H04W 16/10 |
| 2019/0141695 A1 | 5/2019 | Babaei et al. | |
| 2019/0281601 A1 | 9/2019 | Seo et al. | |
| 2020/0221469 A1 | 7/2020 | Lee et al. | |

OTHER PUBLICATIONS

International Search Report and Written Opinion—PCT/US2020/012755—ISA/EPO—dated Mar. 31, 2020 (190959WO).

International Preliminary Report on Patentability—PCT/US2020/012755, the International Bureau of WIPO—Geneva, Switzerland, dated Jul. 22, 2021 (190959WO).

Nokia, et al., "Maintenance for DL Control", 3GPP Draft, R1-1813149, DL Control NOK, 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 11, 2018 (Nov. 11, 2018), XP051555134, 7 pages, Retrieved from the Internet: URL: http://www.3gpp.org/ftp/Meetings%5F3GPP%5FSYNC/RAN1/Docs/R1%2D1813149%2Ezip. [retrieved on Nov. 11, 2018] chapter 4.1.

Nokia, et al., "Resource Allocation/Coordination Between Parent BH and Child links", 3GPP TSG RAN WG1 Meeting #95, R1-1812702, 3rd Generation Partnership Project (3GPP), Mobile Competence Centre, 650, Route Des Lucioles, F-06921, Sophia-Antipolis Cedex, France, Nov. 12, 2018-Nov. 16, 2018, Nov. 3, 2018 (Nov. 3, 2018), 11 Pages, the whole document, Retrieved from the Internet URL: http://www.3gpp.org/ftp/tsg%5Fran/WG1%5FRL1/TSGR1%5F95/Docs/R1%2D1812702%2Ezip pp. 3-4. 2.2. IAB resource types p. 5. 2.3 Resource pool coordination.

\* cited by examiner

US 11,678,364 B2

HALF-DUPLEX OPERATION IN DUAL CONNECTIVITY

CROSS REFERENCE

The present Application for Patent is a Continuation of U.S. patent application Ser. No. 16/736,640 by LEE et al., entitled "HALF-DUPLEX OPERATION IN DUAL CONNECTIVITY" and filed Jan. 7, 2020, which claims the benefit of U.S. Provisional Patent Application No. 62/790,383 by LEE et al., entitled "HALF-DUPLEX OPERATION IN DUAL CONNECTIVITY" and filed Jan. 9, 2019, each of which is assigned to the assignee hereof and expressly incorporated by reference herein.

BACKGROUND

The following relates generally to wireless communications, and to half-duplex operation in dual connectivity.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support half-duplex operation in dual connectivity (DC). Generally, the described techniques provide for the prioritization of communications for respective cells of a DC configuration. In a DC configuration, a single user equipment (UE) may use two or more cells that are respectively associated with different radio access technologies (RATs), and that are each associated with a radio frequency (RF) spectrum band. A UE configured for DC may communicate using the two or more cells, where one cell may act as a reference cell and one or more cells may act as secondary cells.

In some cases, the UE may be configured for (e.g., may support or otherwise be constrained to) half-duplex communications, where the UE may not support transmitting and receiving at the same time. In such cases, the UE may be unable to handle scheduled transmissions where at least a portion of the transmissions overlap or are scheduled to overlap in time (e.g., for at least a portion of a transmission time interval (TTI)). A cell may configure slot scheduling by transmitting a slot format configuration (e.g., a slot format indicator (SFI)), which may indicate the transmission direction of one or more TTIs, or portions thereof, and each cell in a DC configuration may transmit a slot format configuration to a UE. In such cases, the UE may identify, based on the received slot format configurations, a conflict between overlapping communication directions on RF spectrum bands for different cells. In such cases, the UE may determine that the reference cell has priority over the secondary cell. As such, the UE may drop a communication on the secondary cell in favor of a communication on the reference cell, based on the priority. In some cases, the UE may determine to drop the communication based on an RF band or a combination of RF bands used by the cells. Additionally or alternatively, the UE may use techniques to determine whether to prioritize dynamically scheduled communications, which may be based on a power control type of the UE.

A method of wireless communication at a UE is described. The method may include receiving a first slot format configuration for a first cell and a second slot format configuration for a second cell, the first cell being associated with a first RAT and a first RF spectrum band and the second cell being associated with a second RAT and a second RF spectrum band, identifying, for at least a portion of a TTI, a conflict between a first communication direction on the first RF spectrum band for the first cell and a second communication direction on the second RF spectrum band for the second cell, determining, in response to the identified conflict, that the first cell has a priority over the second cell, where the priority is determined based on the first slot format configuration and the second slot format configuration, or the first RF spectrum band and the second RF spectrum band, or a combination thereof, and communicating, during the at least the portion of the TTI, on the first cell in the first communication direction based on the first cell having the priority over the second cell.

An apparatus for wireless communication at a UE is described. The apparatus may include a processor, memory in electronic communication with the processor, and instructions stored in the memory. The instructions may be executable by the processor to cause the apparatus to receive a first slot format configuration for a first cell and a second slot format configuration for a second cell, the first cell being associated with a first RAT and a first RF spectrum band and the second cell being associated with a second RAT and a second RF spectrum band, identify, for at least a portion of a TTI, a conflict between a first communication direction on the first RF spectrum band for the first cell and a second communication direction on the second RF spectrum band for the second cell, determine, in response to the identified conflict, that the first cell has a priority over the second cell, where the priority is determined based on the first slot format configuration and the second slot format configuration, or the first RF spectrum band and the second RF spectrum band, or a combination thereof, and communicate, during the at least the portion of the TTI, on the first cell in the first communication direction based on the first cell having the priority over the second cell.

Another apparatus for wireless communication at a UE is described. The apparatus may include means for receiving a first slot format configuration for a first cell and a second slot format configuration for a second cell, the first cell being associated with a first RAT and a first RF spectrum band and the second cell being associated with a second RAT and a second RF spectrum band, identifying, for at least a portion of a TTI, a conflict between a first communication direction on the first RF spectrum band for the first cell and a second communication direction on the second RF spectrum band for the second cell, determining, in response to the identified conflict, that the first cell has a priority over the second cell, where the priority is determined based on the first slot format configuration and the second slot format configuration, or the first RF spectrum band and the second RF spectrum band, or a combination thereof, and communicating, during the at least the portion of the TTI, on the first cell in the first communication direction based on the first cell having the priority over the second cell.

A non-transitory computer-readable medium storing code for wireless communication at a UE is described. The code may include instructions executable by a processor to receive a first slot format configuration for a first cell and a second slot format configuration for a second cell, the first cell being associated with a first RAT and a first RF spectrum band and the second cell being associated with a second RAT and a second RF spectrum band, identify, for at least a portion of a TTI, a conflict between a first communication direction on the first RF spectrum band for the first cell and a second communication direction on the second RF spectrum band for the second cell, determine, in response to the identified conflict, that the first cell has a priority over the second cell, where the priority is determined based on the first slot format configuration and the second slot format configuration, or the first RF spectrum band and the second RF spectrum band, or a combination thereof, and communicate, during the at least the portion of the TTI, on the first cell in the first communication direction based on the first cell having the priority over the second cell.

Some examples of the method, apparatuses, and non-transitory computer-readable medium described herein may further include operations, features, means, or instructions for dropping, during the at least the portion of the TTI, a communication on the second cell in the second communication direction based on the identified conflict. In some examples of the method, apparatuses, and non-transitory computer-readable medium described herein, determining the priority based on the first RF spectrum band and the second RF spectrum band may include operations, features, means, or instructions for determining the priority based on whether the first RF spectrum band and the second RF spectrum band include a same RF spectrum band or different RF spectrum bands.

In some examples of the method, apparatuses, and non-transitory computer-readable medium described herein, determining the priority based on the first RF spectrum band and the second RF spectrum band may include operations, features, means, or instructions for determining the priority based on a separation in frequency between the first RF spectrum band and the second RF spectrum band.

In some examples of the method, apparatuses, and non-transitory computer-readable medium described herein, determining the priority based on the first RF spectrum band and the second RF spectrum band may include operations, features, means, or instructions for determining the priority based on one or more harmonic frequencies for the first RF spectrum band or the second RF spectrum band.

Some examples of the method, apparatuses, and non-transitory computer-readable medium described herein may further include operations, features, means, or instructions for determining a capability of the UE to support half-duplex communications based on the first RF spectrum band and the second RF spectrum band, and transmitting, to a base station, an indication of the capability to support half-duplex communications.

Some examples of the method, apparatuses, and non-transitory computer-readable medium described herein may further include operations, features, means, or instructions for determining the first communication direction for the at least the portion of the TTI based on the first slot format configuration, and determining the second communication direction for the at least the portion of the TTI based on the second slot format configuration.

In some examples of the method, apparatuses, and non-transitory computer-readable medium described herein, the first communication direction may be semi-statically configured, and the second communication direction may be configured via radio resource control (RRC) signaling, or downlink control information (DCI), or a semi-static SFI, or a combination thereof.

In some examples of the method, apparatuses, and non-transitory computer-readable medium described herein, the UE may be a type 1 UE for power control or a type 2 UE for power control, and the first RAT may be an evolved universal terrestrial radio access (E-UTRA) RAT and the second RAT may be a new radio (NR) RAT.

In some examples of the method, apparatuses, and non-transitory computer-readable medium described herein, the first communication direction may be configured via RRC signaling or a semi-static SFI, or a combination thereof, and the second communication direction may be semi-statically configured.

In some examples of the method, apparatuses, and non-transitory computer-readable medium described herein, the UE may be a type 1 UE for power control or a type 2 UE for power control, and the first RAT may be an NR RAT and the second RAT may be an E-UTRA RAT.

In some examples of the method, apparatuses, and non-transitory computer-readable medium described herein, the first communication direction may be dynamically configured and the dropping may be based on the dynamically configured first communication direction, and the second communication direction may be semi-statically configured. In some examples of the method, apparatuses, and non-transitory computer-readable medium described herein, the UE may be a type 1 UE for power control, and the first RAT may be an NR RAT and the second RAT may be an E-UTRA RAT.

Some examples of the method, apparatuses, and non-transitory computer-readable medium described herein may further include operations, features, means, or instructions for identifying, for the at least the portion of the TTI, one or more flexible symbols for the first cell based on the first slot format configuration, and determining the second communication direction for the at least the portion of the TTI based on the one or more flexible symbols for the first cell. In some examples of the method, apparatuses, and non-transitory computer-readable medium described herein, one or more flexible symbols include a guard period.

Some examples of the method, apparatuses, and non-transitory computer-readable medium described herein may further include operations, features, means, or instructions for identifying, for the at least the portion of the TTI, one or more flexible symbols for the second cell based on the second slot format configuration, and determining the first communication direction for the at least the portion of the TTI based on the one or more flexible symbols for the second cell.

In some examples of the method, apparatuses, and non-transitory computer-readable medium described herein, determining that the first cell may have the priority over the second cell may include operations, features, means, or instructions for determining that the first cell may have the priority over the second cell based on the first RF spectrum band and the second RF spectrum band.

In some examples of the method, apparatuses, and non-transitory computer-readable medium described herein, at least one of the first cell or the second cell operate using time division duplexing (TDD). In some examples of the method, apparatuses, and non-transitory computer-readable medium described herein, the first cell and the second cell may be synchronized. In some examples of the method, apparatuses, and non-transitory computer-readable medium described herein, the first cell includes a reference cell and the second cell includes another cell.

In some examples of the method, apparatuses, and non-transitory computer-readable medium described herein, the reference cell includes a master cell group (MCG) of a DC configuration including the other cell, and the other cell includes a secondary cell group (SCG) of the DC configuration.

DETAILED DESCRIPTION

Figure 1:
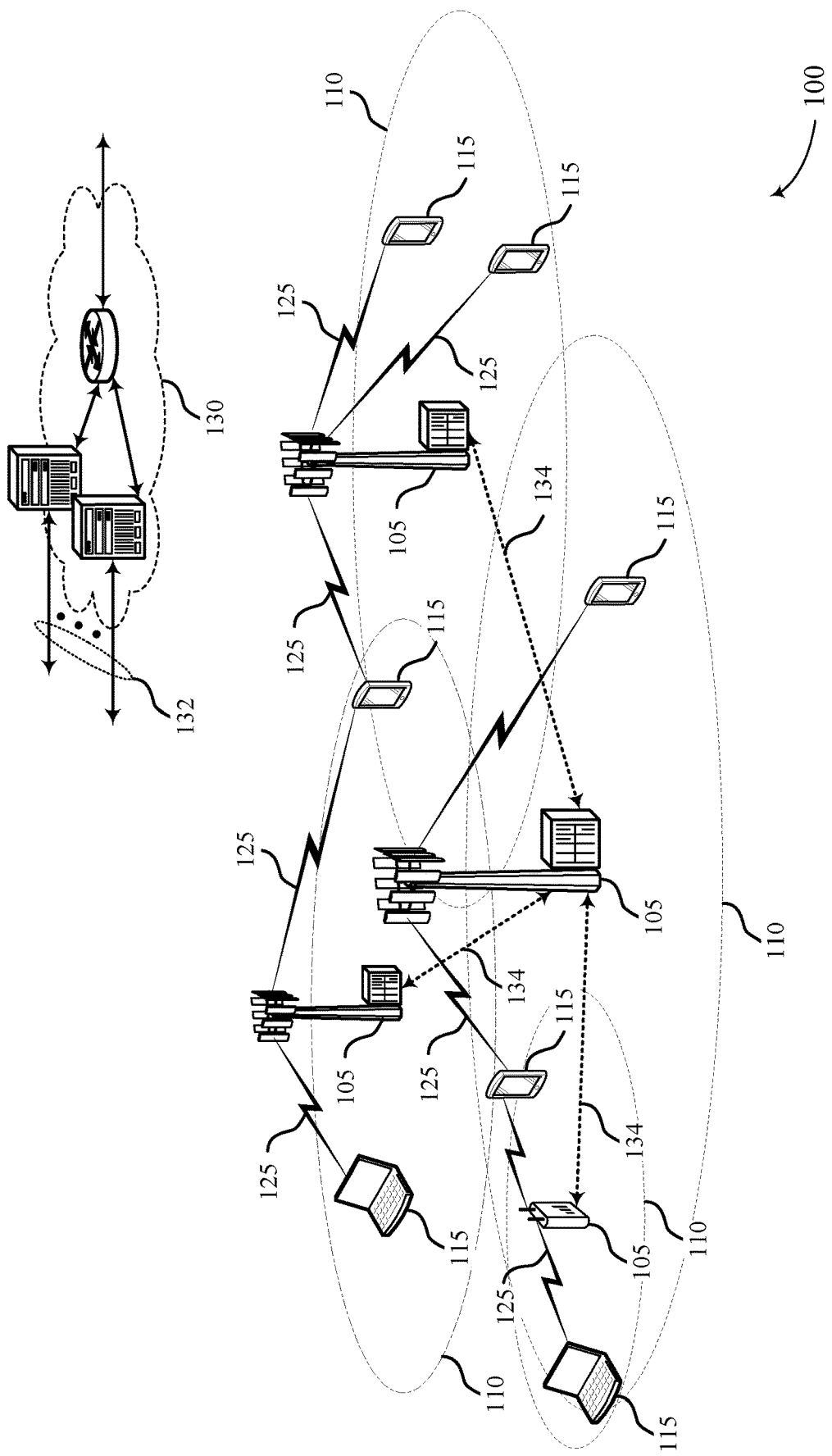
FIG. 1 illustrates an example of a system for wireless communications that supports half-duplex operation in dual connectivity (DC) in accordance with aspects of the present disclosure.

In some wireless communications systems, a UE may communicate (e.g., be configured to communicate) according to a dual connectivity (DC) configuration. In such cases, the UE may simultaneously communicate with different base stations or cells, where a first base station providing a first cell may be referred to as a master base station and the first cell may be referred to as a primary cell. Likewise, a second base station providing a second cell may be referred to as a secondary base station and the second cell may be referred to as a secondary cell. In some cases, the different cells may also be associated with different radio access technologies (RATs). The first and second base station may communicate using a first RAT and a second RAT, respectively, where either the first RAT or the second RAT may include, for example, Long Term Evolution (LTE), New Radio (NR), or another RAT. Such DC deployments may be referred to as evolved universal terrestrial radio access (E-UTRA) new radio (NR)-dual connectivity (EN-DC), NR E-UTRA LTE-DC (NE-DC), or may include other types of multi-radio access technology-DC (MR-DC)). The different cells may use the same or different radio frequency (RF) bands for communications.

In some cases, however, aspects of the DC configuration may not permit the UE to simultaneously communicate with both cells. More specifically, the UE may utilize a configuration for a first cell (e.g., a second slot format configuration) to transmit on the first cell in the uplink direction at the same time the UE is to receive data in the downlink direction on a second cell according to another configuration for the second cell (e.g., a second slot format configuration). In some cases, the UE may be configured for full-duplex communications, where the UE can transmit and receive at the same time, and may be able to accommodate the simultaneous transmissions.

But, in cases where the UE does not support full-duplex communications (e.g., due to configuration or capability limitations), the UE may experience a conflict in communications directions for a period of time (e.g., for at least a portion of a particular transmission time interval (TTI), such as a symbol period, a slot, or the like). Further, half-duplex operations may be unavoidable in some cases, such as when a combination of the RF bands used for communication on each cell may affect the UE's ability to communicate with multiple cells simultaneously (such as when filtering and/or rejection schemes are unavailable). Accordingly, when using half-duplex communications, uplink transmissions may impact downlink reception at the UE, or downlink reception may impact uplink transmission, for example, in cases where at least a portion of the transmissions overlap or are scheduled to overlap in time.

As described herein, a reference cell may be utilized to designate a priority to a communication direction in cases where a UE that is configured for half-duplex operations encounters a conflict with simultaneous communications on different cells. As an example, the reference cell may correspond to the primary cell in the DC configuration and the communication direction associated with the reference cell may be prioritized over one or more other communication directions. As an illustrative example, in an EN-DC deployment, the reference cell may correspond to an E-UTRA cell, whereas in an NE-DC deployment, the reference cell may correspond to an NR cell.

If a conflict arises with half-duplex communications in such DC configurations, the UE's behavior may be further based on a power control type of the UE (e.g., Type 1 or Type 2 for power control). For instance, the UE may prioritize communications on a cell with dynamic scheduling when the UE is a Type 1 UE (e.g., such as in cases where scheduling information is exchanged between cells). Additionally or alternatively, a Type 1 and/or a Type 2 UE may utilize semi-static prioritization when conflicts arise (e.g., where there may be no dynamic coordination between cells). As such, the network may prevent conflicts with dynamic scheduling on each cell.

Aspects of the disclosure are initially described in the context of wireless communications systems. Further examples are then provided with respect to a process flow that illustrates handling of half-duplex communications in a DC deployment. Aspects of the disclosure are further illustrated by and described with reference to apparatus diagrams, system diagrams, and flowcharts that relate to half-duplex handling in carrier aggregation.

FIG. 1 illustrates an example of a wireless communications system 100 that supports half-duplex operation in dual connectivity in accordance with aspects of the present disclosure. The wireless communications system 100 includes base stations 105, UEs 115, and a core network 130. In some examples, the wireless communications system 100 may be a LTE network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In wireless communications system 100, a UE 115 may communicate according to a DC configuration, where a reference cell associated with a first RAT and a first RF spectrum band is served by a first base station, and one or more secondary cells associated with a second RAT and a second RF spectrum band are served by a second base station. One or multiple cells may schedule the UE 115 based on a number of capabilities indicated for the UE 115. In some cases, the UE 115 may be configured for full-duplex communications, where the UE 115 may transmit and receive at the same time. However, if the UE 115 is configured for half-duplex communications, for example, because the UE 115 does not support full-duplex communications, then the UE 115 may not support transmitting and receiving at the same time. In half-duplex communications, uplink transmissions may impact downlink reception at the UE 115, or downlink reception may impact uplink transmission, for example, in cases where at least a portion of the transmissions overlap or are scheduled to overlap in time.

A cell may configure slot scheduling by transmitting a slot format indicator (SFI), which may indicate a transmission direction of one or more TTIs. In some cases, a slot or a symbol, or a combination thereof, may be an example of a TTI. The cell may transmit a semi-static SFI, an RRC-configured SFI, a dynamic SFI, or any combination thereof to configure one or more TTIs. A semi-static SFI may indicate a number of downlink slots, downlink symbol periods, flexible symbols, uplink symbols, and uplink slots for the cell. The uplink and downlink symbol periods and slots configured by the semi-static SFI may not be reconfigured, but the flexible symbols and flexible slots may be reconfigured by an RRC-configured SFI, dynamic SFI, or received grant (e.g., received via downlink control information (DCI)). Generally, dynamic scheduling (e.g., via a dynamic SFI or grant) may take priority over RRC-configured scheduling (e.g., via an RRC-configured SFI) for the cell.

In a DC configuration, a cell may transmit an SFI or other transmission to the UE 115 indicating scheduled transmissions in different directions at the same time. If the UE 115 is configured to operate according to half-duplex communications however, the UE 115 may be unable to both transmit and receive at the same time as indicated by the multiple SFIs. Thus, the UE 115 may implement techniques to drop a transmission associated with a given cell or RAT, or to determine whether to use the allocation to transmit or receive.

A UE 115 described herein may implement techniques for half-duplex operation in DC. For example, the UE 115 may receive one or more slot format configurations for a first cell (e.g., a reference cell) of a DC configuration, where the first cell is associated with a first RAT, and may receive one or more slot format configurations for a second cell of a DC configuration, where the second cell is associated with a second RAT. The UE 115 may determine that there is a scheduling conflict between the received slot configurations. For example, there may be a conflict in the communication directions of RF spectrum bands associated with the slots. In such cases, the UE 115 may further determine that the first cell has a priority over the second cell, and may drop communications on the second cell in response to the identified priority. The UE 115 may then communicate using the first cell during the scheduled TTI.

Figure 2:
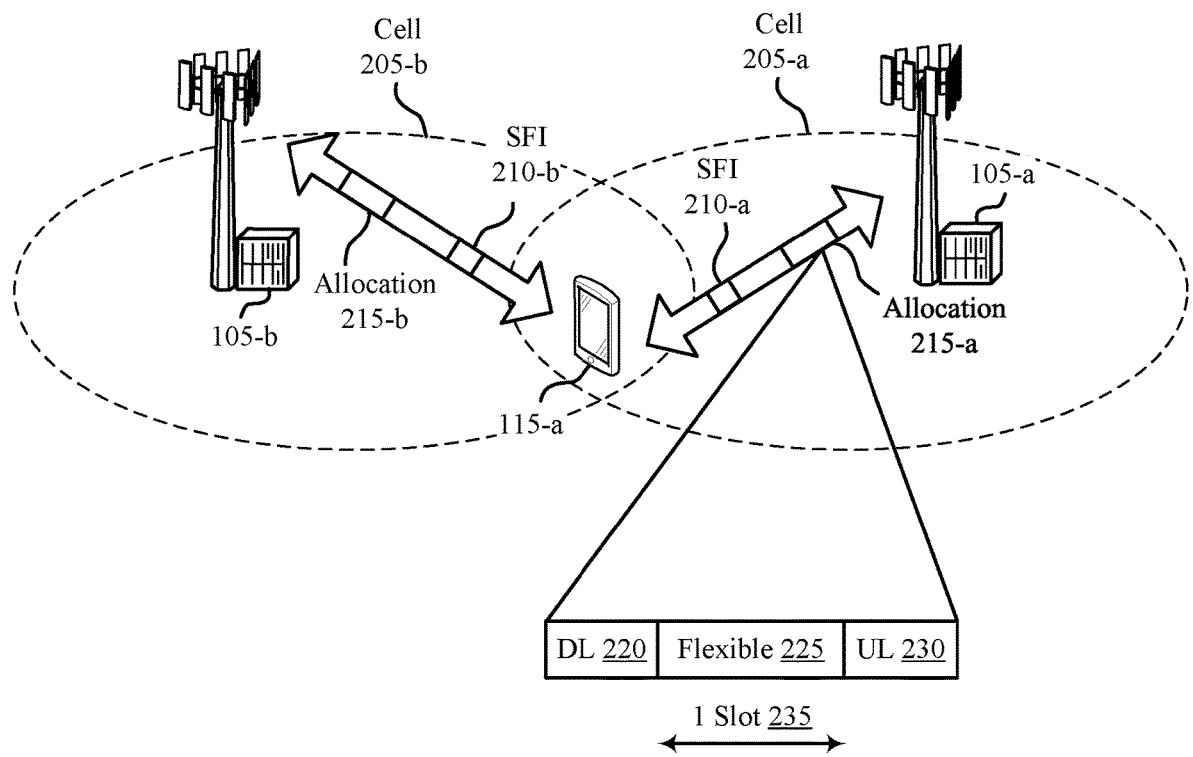
FIG. 2 illustrates an example of a system for wireless communications that supports half-duplex operation in DC in accordance with aspects of the present disclosure.

FIG. 2 illustrates an example of a wireless communication system 200 that supports half-duplex operation in DC in accordance with aspects of the present disclosure. In some examples, the wireless communications system 200 may implement aspects of wireless communications system 100. For example, wireless communications system 200 includes UE 115-*a*, first base station 105-*a*, and second base station 105-*b*, which may be examples of the corresponding devices described with reference to FIG. 1. Wireless communications system may support the prioritization of communications for a reference cell in a DC configuration.

UE 115-*a* may communicate using a number of RFs corresponding to different RATs, such as in a DC deployment. In some cases, UE 115-*a* may be configured to communicate using multiple cell groups within a wireless network. For example, UE 115-*a* may communicate with a first base station 105-*a* which may provide a reference cell 205-*a*, associated with a first RAT, to UE 115-*a*. Further, UE 115-*a* may communicate with a second base station 105-*b*, which may provide a secondary cell 205-*b*, associated with a second RAT, to UE 115-*a*.

In some cases, UE 115-*a* may be configured for half-duplex communications and may not support transmitting and receiving at the same time (e.g., UE 115-*a* may not support two-way or full-duplex communications). In some other cases, UE 115-*a* may be capable of communicating using full-duplex communications, but UE 115-*a* may be restricted to use or configured to use a half-duplex configuration. In half-duplex communications, an uplink transmission at UE 115-*a* may impact a downlink transmission reception, or a downlink reception may impact an uplink transmission, when both transmission and reception are scheduled to occur in overlapping time slots.

In one example, UE 115-*a* may communicate using half-duplex to support intra-band DC communications with both a first RAT and a second RAT within a same RF spectrum band. For example, in a half-duplex communications deployment, UE 115-*a* may transmit a packet using the first RAT, and may receive a different packet using the second RAT, given the transmission and reception occur during non-overlapping slots (e.g., such that transmission/reception interference may not occur).

In another example, UE 115-*a* may communicate using half-duplex to support inter-band DC communications on frequencies that may be spatially close, and therefore subject to increased interference. Transmission and reception at UE 115-*a* in such examples may occur on different frequencies during different time slots. Additionally or alternatively, UE 115-*a* may communicate using half-duplex to support inter-band DC communications with a first RAT and a second RAT within different RF spectrum bands that may otherwise exhibit interference or harmonics due to some RF band combinations. For example, in a half-duplex communications deployment, UE 115-*a* may transmit a packet using the first RAT on a first RF spectrum band, and may receive a transmission using the second RAT on a second RF spectrum band. Such examples of a half-duplex configuration may reduce the likelihood of interference (e.g., signal loss, frequency harmonics) between transmission and reception at UE 115-*a*. In some examples, UE 115-*a* may communicate using half-duplex to support inter-band DC communications in cases where UE 115-*a* may communicate according to TDD or another similar procedure for both transmission and reception during an overlapping time slot.

In some cases, a cell 205 associated with a first RAT (e.g., cell 205-*a*) may configure scheduling by transmitting an SFI 210, such as SFI 210-*a*, which may indicate transmission directions in one or more TTIs. SFI 210-*a* may indicate a single transmission direction or multiple transmission directions for transmissions within a TTI. In some cases, a slot such as slot 235, or a symbol, or a combination thereof, may be an example of a TTI. The cell may transmit a semi-static SFI, an RRC-configured SFI, a dynamic SFI, or any combination thereof to configure slot 235.

For some RATs, an allocation 215 may include different resources or portions corresponding to different communication directions. For instance, allocation 215-*a* may include a downlink portion 220 (e.g., downlink symbol period), an uplink portion 230 (e.g., uplink symbol period), and optionally a flexible portion 225 (e.g., flexible symbols or slot). In some cases, the uplink symbol period, downlink symbol period, and slots configured by the semi-static SFI may not be reconfigured, but flexible symbols and flexible slots (e.g., such as flexible slot 225) may be reconfigured by an RRC-configured SFI, dynamic SFI, or received grant (e.g., received via DCI), such that both uplink and downlink transmissions may occur within a TTI. Each cell 205 may transmit a semi-static SFI 210, configure slot scheduling via RRC signaling, transmit dynamic scheduling, or any combination thereof.

Cell 205-*b* may also transmit an SFI 210 (e.g., SFI 210-*b*) which may schedule a transmission on an allocation 215 (e.g., allocation 215-*b*). In some cases, allocation 215-*b* may overlap with allocation 215-*a*. As described herein, allocation 215-*b* may be configured to have a downlink portion 220, a flexible portion 225, and an uplink portion 230, which may be based on the RAT associated with allocation 215-*b*. The downlink portion 220 may include one or more downlink TTIs, and the uplink portion 230 may include one or more uplink TTIs.

However, the SFIs 210 transmitted by the multiple cells may indicate to the UE 115-*a* to transmit or receive in different directions at the same time (e.g., according to a full-duplex configuration). If UE 115-*a* is configured to operate according to half-duplex communications, UE 115-*a* may be unable to transmit and receive at the same time (e.g., in different directions) as indicated by the multiple SFIs 210. The inability of the UE 115-*a* to transmit and receive in full-duplex may also be based on an RF band combination configuration. For example, the UE 115-*a* may communicate using TDD for one transmission, and FDD for a second transmission. Further, UE 115-*a* may communicate using either TDD of FDD for both first and second transmissions. In such examples, UE 115-*a* may indicate a half-duplex capability based on the band combination (e.g., by transmitting an indication that UE 115-*a* does not support full-duplex communications).

Further, UE 115-*a* may provide an indication of an ability to support full-duplex operation, or whether UE 115-*a* is constrained to half-duplex operation during a given time slot 235. In such cases described herein, UE 115-*a* may implement a number of techniques in order to maintain a half-duplex configuration for ongoing communications. For example, one technique may include UE 115-*a* determining whether to drop a transmission or whether to use an allocation 215 provided by an SFI 210 to transmit or receive a transmission. The determination to either drop or transmit/receive a transmission may be influenced by a type of one or more SFIs 210 received from a reference cell 205-*a*, a type of one or more SFIs 210 received from a secondary cell 205-*b*, the transmission direction for the reference cell 205-*a*, or the transmission direction for the secondary cell 205-*b*.

In an example, a reference cell 205-*a*, or a secondary cell 205-*b*, or both, may transmit a semi-static SFI 210 to configure a set of flexible TTIs 225, including a first TTI configured for either transmission, or reception, or both. The reference cell 205-*a* may transmit an SFI 210-*a* which may allocate the first TTI to a first direction for the reference cell. In some examples, reference cell 205-*a* may exhibit a higher priority than the secondary cell 205-*b*. UE 115-*a* may also receive one or more SFIs 210-*b* from the secondary cell 205-*b*, where the one or more SFIs 210 may indicate a configuration of the first TTI with respect to the secondary cell 205-*b*. In some cases, the configuration for the secondary cell 205-*b* may contradict the configuration for the reference cell 205-*a* (e.g., may indicate a different communication direction), which may result in conflicting scheduling assignments for the first TTI. In some cases, the UE 115-*a* may give priority to the SFI 210-*a* of reference cell 205-*a* over dynamic SFIs received from other secondary cells (e.g., over SFI 210-*b*). As such, the UE 115-*a* may drop the assignments or allocations 215 for the other cells 205 if the assignments or allocations 215 contradict the configuration for the reference cell 205-*a*.

In an example, a reference cell 205-*a*, or a secondary cell 205-*b*, or both, may transmit a semi-static SFI to configure a set of flexible TTIs 225, including a first TTI. Reference cell 205-*a* may transmit an RRC-configured SFI to assign the first TTI to a first direction for the reference cell. The UE 115-*a* may also receive one or more SFIs 210-*b* from the secondary cell 205-*b* which configure the first TTI for the secondary cell. In some cases, the configuration for the secondary cell 205-*b* may contradict (or assign the first TTI in an opposite direction from) the configuration for the reference cell 205-*a*. Thus, the UE 115-*a* may seem to have a conflicting scheduling assignment for the first TTI. In some cases, UE 115-*a* may give priority to the RRC-configured SFI of the reference cell over dynamic and RRC-configured SFIs received from other cells. The UE 115-*a* may drop the assignments or allocations 215 for the other cells if they contradict the configuration for the reference cell 205-*a*. In some cases, semi-static downlink may include RRC configured downlink (e.g., physical downlink control channel (PDCCH) monitoring). In some cases, semi-static uplink may include RRC-configured uplink (e.g., periodic channel state information (CSI) and/or sounding reference signal (SRS) transmission).

Reference cell 205-*a* may have different characteristics based on aspects of an associated RAT. In one example, in an EN-DC configuration, E-UTRA may be the reference cell 205-*a* or master cell group (MCG), and NR may be the other cell 205-*b* or secondary cell group (SCG). In another example, in an NE-DC configuration, NR may be the reference cell 205-*a* or MCG and E-UTRA may be the other cell 205-*b* or SCG.

In addition to prioritization of the reference cell 205-*a* and secondary cell 205-*b*, UE-level coordination may further be used to resolve scheduling conflict. In some cases, UE 115-*a* may be a type-1 UE for power control, and may be configured to communicate using a number of RATs. In one example, a type-1 UE may communicate with E-UTRA and NR RATs. Scheduling information may be exchanged between E-UTRA and NR, and dynamic scheduling may support prioritization of both transmissions and receptions at the UE 115-*a*. In other cases, UE 115-*a* may be a type-2 UE for power control, and may similarly be configured to communicate using a number of RATs. In one example, a type-2 UE 115 may communicate using E-UTRA and NR RATs. The type-2 UE may not be configured to support the exchange of dynamic scheduling information between E-UTRA and NR, and thus may support semi-static prioritization of transmissions and receptions at the UE 115-a.

In a first example, UE 115-a may be configured to implement prioritization as described with reference to Table 1. UE 115-a may be configured as either a type-1 or type-2 UE. UE 115-a may identify a scheduling conflict between a reference cell 205-a and secondary cell 205-b, and may select a cell on which to drop one or more communications based on the identifying. According to the first example, UE 115-a may select which communication to drop based on a number of configurations of the other cell 205-b, and UE 115-a may not determine that TTIs (assigned by the semi-static SFI) may be overwritten by dynamic signaling.

TABLE 1

UE communication prioritization based on a number of communications on a non-reference cell

| Reference Cell | Other Cell | Prioritization/UE Behavior |
| --- | --- | --- |
| Semi-static downlink | Semi-static uplink SFI | Error Case (intra-band) UE is allowed to drop uplink (inter-band) |
| Semi-static downlink | RRC conf uplink | UE is allowed to drop uplink |
| Semi-static downlink | Dynamic uplink | UE is allowed to drop uplink or error case (inter-band) Error Case (intra-band) |
| Semi-static uplink | Semi-static downlink SFI | UE is allowed to drop downlink (inter-band) Error Case (intra-band) |
| Semi-static uplink | RRC-configured downlink | UE is allowed to drop downlink |
| Semi-static uplink | Dynamic downlink | UE is allowed to drop downlink or error case (inter-band) Error Case (intra-band) |
| Flexible (guard period) | | Follow NR carrier aggregation rule |

As stated, the reference cell 205-a may be an E-UTRA cell, which may be semi-statically configured for both uplink and downlink communications (e.g., no dynamic grant may be allocated). There may be no distinction between type-1 and type-2 UEs operating in an E-UTRA deployment. The other cell 205-b may be an NR cell, which may support semi-static configurations of downlink and uplink transmissions based on dynamic scheduling information. In addition, RRC downlink and uplink may provide UE-specific RRC-configured settings for uplink and downlink (e.g., a search space that is RRC-configured is RRC-configured downlink, or RRC-configured CSI reporting with uplink or downlink). Further, dynamic downlink and uplink communications may grant UE 115-a transmission periods using, for example, DCI for the transmission.

In cases where the E-UTRA reference cell 205-a is configured for semi-static downlink communications, UE 115-a may either drop the scheduled uplink transmission for inter-band, or UE 115-a may detect an error case for intra-band. During cases where the E-UTRA reference cell is configured for semi-static uplink communications, UE 115-a may either drop the scheduled downlink transmission for inter-band, or UE 115-a may detect an error case for intra-band. During cases where the E-UTRA reference cell is configured for a flexible-guard period (e.g., E-UTRA does not specify uplink or downlink), UE 115-a may follow rules specified for NR carrier aggregation.

In a second example, UE 115-a may be configured to follow the implement prioritization as described with reference to Table 2. UE 115-a may, in this example, be a type 1 UE. UE 115-a may identify a scheduling conflict between a reference cell 205-a and a secondary cell 205-b, and may select a cell on which to drop communications based on the identifying. In this example, the reference cell 205-a may be an NR cell, and the other cell 205-b may be an E-UTRA cell. According to the second example, UE 115-a may select a transmission to drop based on a configuration of the other cell 205-b, where the other cell 205-b may be semi-statically configured for uplink or downlink. In this example, UE 115-a may overwrite TTIs assigned by the reference cell using dynamic prioritization or signaling. As such, UE 115-a may dynamically drop a transmission based on a number of factors, such as information provided by a grant.

TABLE 2

UE communication prioritization based on a configuration for a non-reference cell

| Reference Cell | Other Cell | Prioritization/UE Behavior |
| --- | --- | --- |
| Semi-static downlink SFI | Semi-static uplink | UE is allowed to drop uplink (inter-band) Error Case (intra-band) |
| RRC-configured downlink | Semi-static uplink | UE is allowed to drop uplink or error case |
| Dynamic downlink | Semi-static uplink | UE is allowed to drop uplink or error case |
| Semi-static uplink SFI | Semi-static downlink | UE is allowed to drop downlink (inter-band) Error Case (intra-band) |
| RRC-configured uplink | Semi-static downlink | UE is allowed to drop downlink or error case |
| Dynamic uplink | Semi-static downlink | UE is allowed to drop downlink or error case |
| Flexible (guard period) | | Follow NR carrier aggregation rule |

As described herein, the reference cell 205-a may be an NR cell, which may be both dynamically configured and semi-statically configured for uplink and downlink communications. The reference cell 205-a may also be RRC-configured for both uplink and downlink communications. The other cell 205-b may be an E-UTRA cell, which may support semi-static configurations of downlink and uplink transmissions based on semi-static scheduling information. Further, dynamic downlink and uplink communications may grant UE transmission periods using, for example, DCI for the transmission.

In cases where the other cell 205-b is semi-statically configured in the uplink, UE 115-a may either drop the uplink transmission from the other cell configuration (e.g., for inter-band) or may detect an error case (e.g., for intra-band). In cases where the other cell 205-b is a semi-statically configured in the downlink, UE 115-a may either drop the downlink transmission from the other cell configuration (e.g., for inter-band) or may detect an error case (e.g., for intra-band). In cases where the other cell 205-b is configured for a flexible-guard period (e.g., the other cell 205-b does not specify uplink or downlink), UE 115-a may follow rules specified for NR carrier aggregation.

In a third example, UE 115-a may be configured to follow implement the prioritization as described with reference to Table 3. UE 115-a may, in this example, be a type 2 UE. UE 115-a may identify a scheduling conflict between a reference cell 205-a and a secondary cell 205-b, and may select a cell on which to drop communications based on the identifying. In this example, the reference cell 205-a may be an NR cell, and the other cell 205-b may be an E-UTRA cell. According to the third example, UE 115-a may select a transmission to drop based on a configuration of the other cell 205-b, where the other cell may be semi-statically configured for uplink or downlink. In this example, UE 115-a may not overwrite TTIs assigned by the reference cell 205-a, as no dynamic prioritization or signaling may occur for the type-2 UE case. As such, UE 115-a may dynamically drop a transmission based on a number of factors, such as information provided by a grant.

TABLE 3

UE communication prioritization based on one or more configurations for a non-reference cell

| Reference Cell | Other Cell | Prioritization/UE Behavior |
| --- | --- | --- |
| Semi-static downlink SFI | Semi-static uplink | UE is allowed to drop uplink (inter-band) Error Case (intra-band) |
| RRC conf downlink | Semi-static uplink | UE is allowed to drop uplink or error case |
| Dynamic downlink | Semi-static uplink | Error Case |
| Semi-static uplink SFI | Semi-static downlink | UE is allowed to drop downlink (inter-band) Error Case (intra-band) |
| RRC conf uplink | Semi-static downlink | UE is allowed to drop downlink or error case |
| Dynamic uplink | Semi-static downlink | Error Case |
| | Flexible (guard period) | Follow NR carrier aggregation rule |

As described herein, the reference cell 205-a may be an NR cell, which may be both dynamically configured and semi-statically configured for uplink and downlink communications. The reference cell 205-a may also be RRC-configured for both uplink and downlink communications. The other cell 205-b may be an E-UTRA cell, which may support semi-static configurations of downlink and uplink transmissions based on semi-static scheduling information. Further, dynamic downlink and uplink communications may grant UE 115-a transmission periods using, for example, DCI for the transmission.

In cases where the other cell 205-b is semi-statically configured in the uplink, and where the reference cell 205-a is either semi-statically configured downlink or RRC-configured in the downlink, UE 115-a may either drop the uplink transmission from the other cell configuration (e.g., for inter-band) or may detect an error case (e.g., for intra-band). In cases where the other cell 205-b is semi-statically configured in the uplink and the reference cell 205-a is dynamically configured in the downlink, UE 115-a may detect an error case for both inter-band and intra-band. In cases where the other cell 205-b is semi-statically configured in the downlink, and the reference cell 205-a is either semi-statically configured downlink or RRC configured downlink, UE 115-a may either drop the downlink transmission from the other cell configuration (e.g., for inter-band) or may detect an error case (e.g., for intra-band). In cases where the other cell 205-b is semi-statically configured in the downlink and the reference cell 205-a is dynamically configured in the uplink, UE 115-a may detect an error case for both inter-band and intra-band. Further, in cases where the other cell 205-b is configured for a flexible-guard period (e.g., the other cell 205-b does not specify uplink or downlink), UE 115-a may follow rules specified for NR carrier aggregation.

Figure 3:
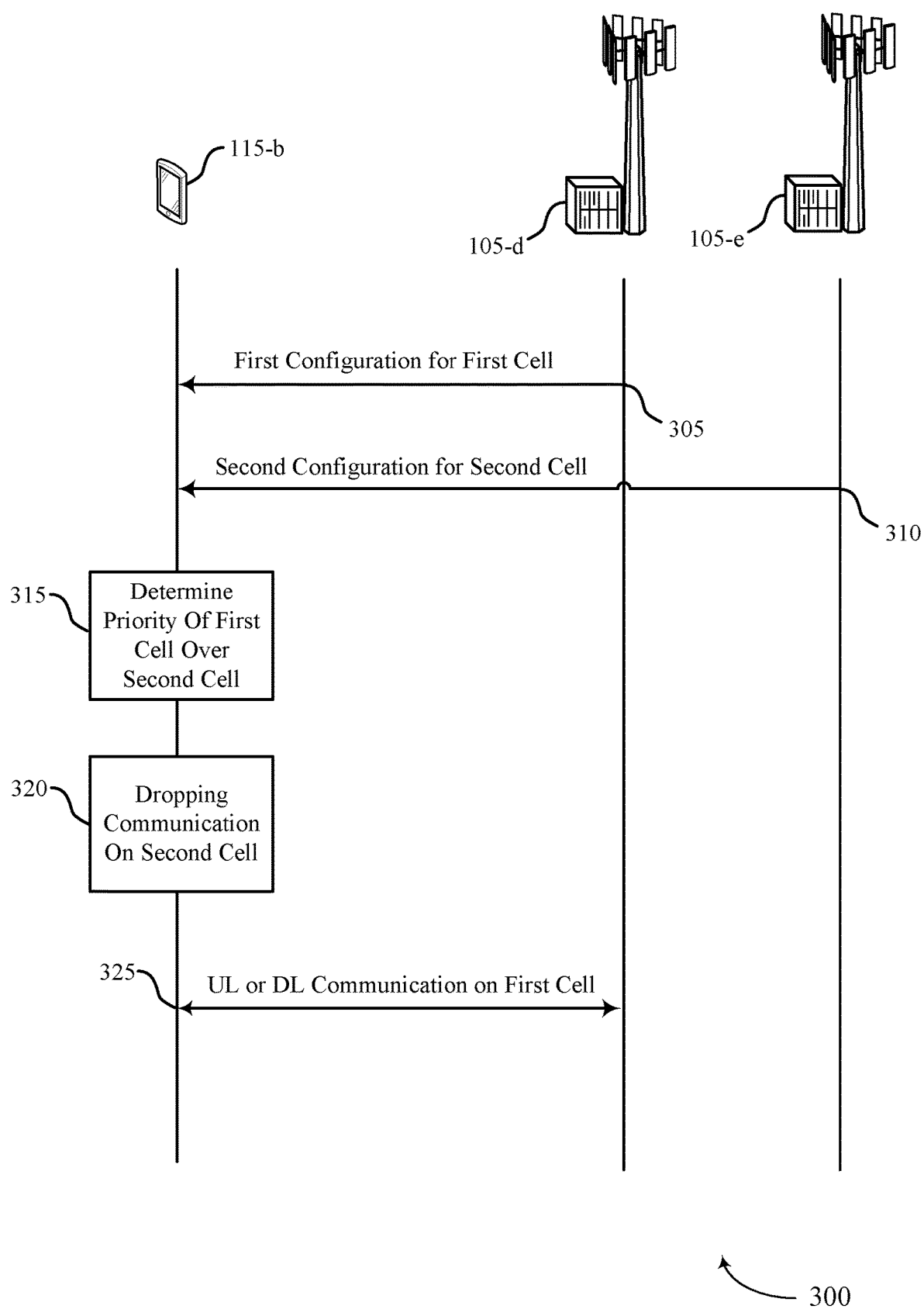
FIG. 3 illustrates an example of a process flow in a system that supports half-duplex operation in DC in accordance with aspects of the present disclosure.

FIG. 3 illustrates an example of a process flow 300 in a system that supports half-duplex operation in DC in accordance with aspects of the present disclosure. In some examples, process flow 300 may implement aspects of wireless communications system 100. Process flow 300 may include or be implemented by base stations 105-d and 105-e and UE 115-b, which may be respective examples of base stations 105 and a UE 115 as described herein. In some cases, base station 105-d may provide multiple cells for UE 115-b, where each cell is associated with a RAT and corresponding RF spectrum band configuration. In some other examples, base station 105-d may provide a cell for a first RAT and other base stations 105 (e.g., base station 105-e) may provide one or more cells for a second RAT and corresponding RF spectrum band configuration.

At 305, UE 115-b may receive a first slot format configuration for a first cell associated with a first RAT and a first RF spectrum band from a first base station 105-d.

At 310, UE 115-b may receive, following reception of the first slot format configuration, a second slot format configuration for a second cell associated with a second RAT and a second RF spectrum band from a second base station 105-e. In other examples, the first slot format configuration and the second slot format configuration may be received from first base station 105-d (e.g., in cases where first base station 105-d provides an MCG). Additionally or alternatively, the first slot format configuration and the second slot format configuration may be received from second base station 105-e (e.g., in cases where second base station 105-e provides an MCG). In such examples, base stations 105-d and/or 105-e may provide slot format configurations via dynamic signaling on one or multiple communication links to UE 115-b (e.g., via a dynamic grant). UE 115-b may further identify a conflict between a first communication direction on the first RF spectrum band for the first cell and a second communication direction on the second RF spectrum band for the second cell for at least a portion of a TTI.

At 315, UE 115-b may determine that the first cell has a priority over the second cell. UE 115-b may determine the priority based on the first slot format configuration and the second slot format information, based on the first RF spectrum band and the second RF spectrum band, or based on any combination thereof. For example, UE 115-b may determine a priority based on the first RF spectrum band and the second RF spectrum band being the same or different RF spectrum bands.

At 320, UE 115-b may drop a communication on the second cell in the second communication direction based on the identified conflict between the first RF spectrum band and the second RF spectrum band. In some cases, determining to drop communications on the second cell based on the second communication direction conflicting with the first communication direction may be based on a number of cell configurations. For example, determining to drop communications on the second cell may be based on the received first slot format configuration including a dynamic RRC downlink signal, and the second slot format configuration including a semi-static uplink or downlink configuration.

At 325, UE 115-b may communicate on the first cell in the first communication direction during at least the portion of the TTI, and based on the first cell having priority over the second cell.

Figure 4:
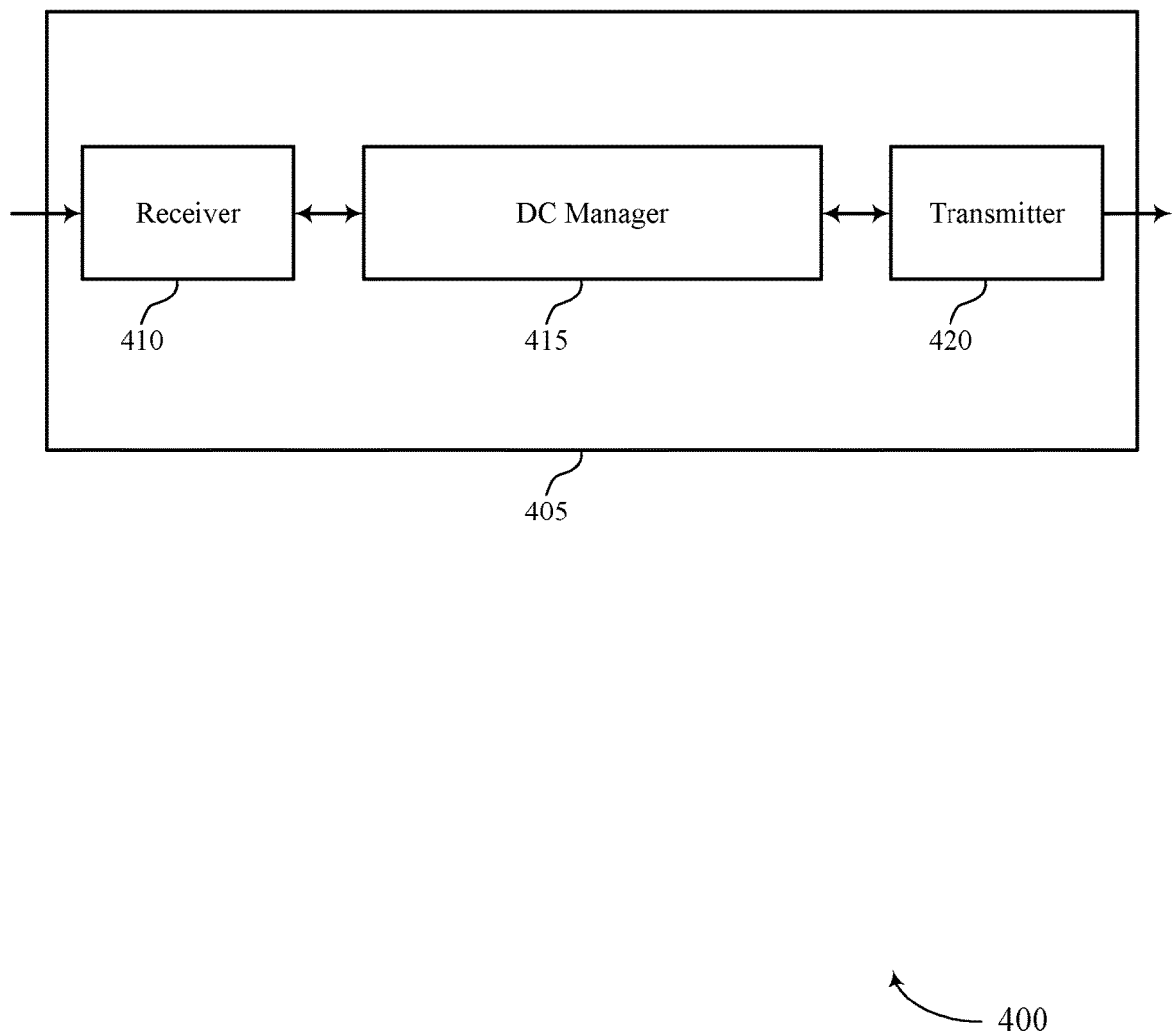
FIGS. 4 and 5 show block diagrams of devices that support half-duplex operation in DC in accordance with aspects of the present disclosure.

FIG. 4 shows a block diagram 400 of a device 405 that supports half-duplex operation in DC in accordance with aspects of the present disclosure. The device 405 may be an example of aspects of a UE 115 as described herein. The device 405 may include a receiver 410, a DC manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to half-duplex operation in DC, etc.). Information may be passed on to other components of the device 405. The receiver 410 may be an example of aspects of the transceiver 720 described with reference to FIG. 7. The receiver 410 may utilize a single antenna or a set of antennas.

The DC manager 415 may receive a first slot format configuration for a first cell and a second slot format configuration for a second cell, the first cell being associated with a first RAT and a first RF spectrum band and the second cell being associated with a second RAT and a second RF spectrum band. The DC manager 415 may identify, for at least a portion of a TTI (e.g., a symbol, a slot, a mini slot), a conflict between a first communication direction on the first RF spectrum band for the first cell and a second communication direction on the second RF spectrum band for the second cell and determine, in response to the identified conflict, that the first cell has a priority over the second cell, where the priority is determined based on the first slot format configuration and the second slot format configuration, or the first RF spectrum band and the second RF spectrum band, or a combination thereof. The DC manager 415 may communicate, during the at least the portion of the TTI, on the first cell in the first communication direction based on the first cell having the priority over the second cell. The DC manager 415 may be an example of aspects of the DC manager 710 described herein.

The DC manager 415, or its sub-components, may be implemented in hardware, code (e.g., software or firmware) executed by a processor, or any combination thereof. If implemented in code executed by a processor, the functions of the DC manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The DC manager 415, or its sub-components, may be physically located at various positions, including being distributed such that portions of functions are implemented at different physical locations by one or more physical components. In some examples, the DC manager 415, or its sub-components, may be a separate and distinct component in accordance with various aspects of the present disclosure. In some examples, the DC manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

The actions performed by the DC manager 415 as described herein may be implemented to realize one or more potential advantages. For example, DC manager 415 may support prioritization of conflicting communications (e.g., communications that overlap in time and are associated with different communication directions). DC manager 415 may thus reduce transmission delays, improve transmission accuracy, and reduce retransmissions by reducing interference between conflicting communications. DC manager 415 may further save power and increase battery life at a UE 115 by reducing transmission delays and retransmissions.

Figure 5:
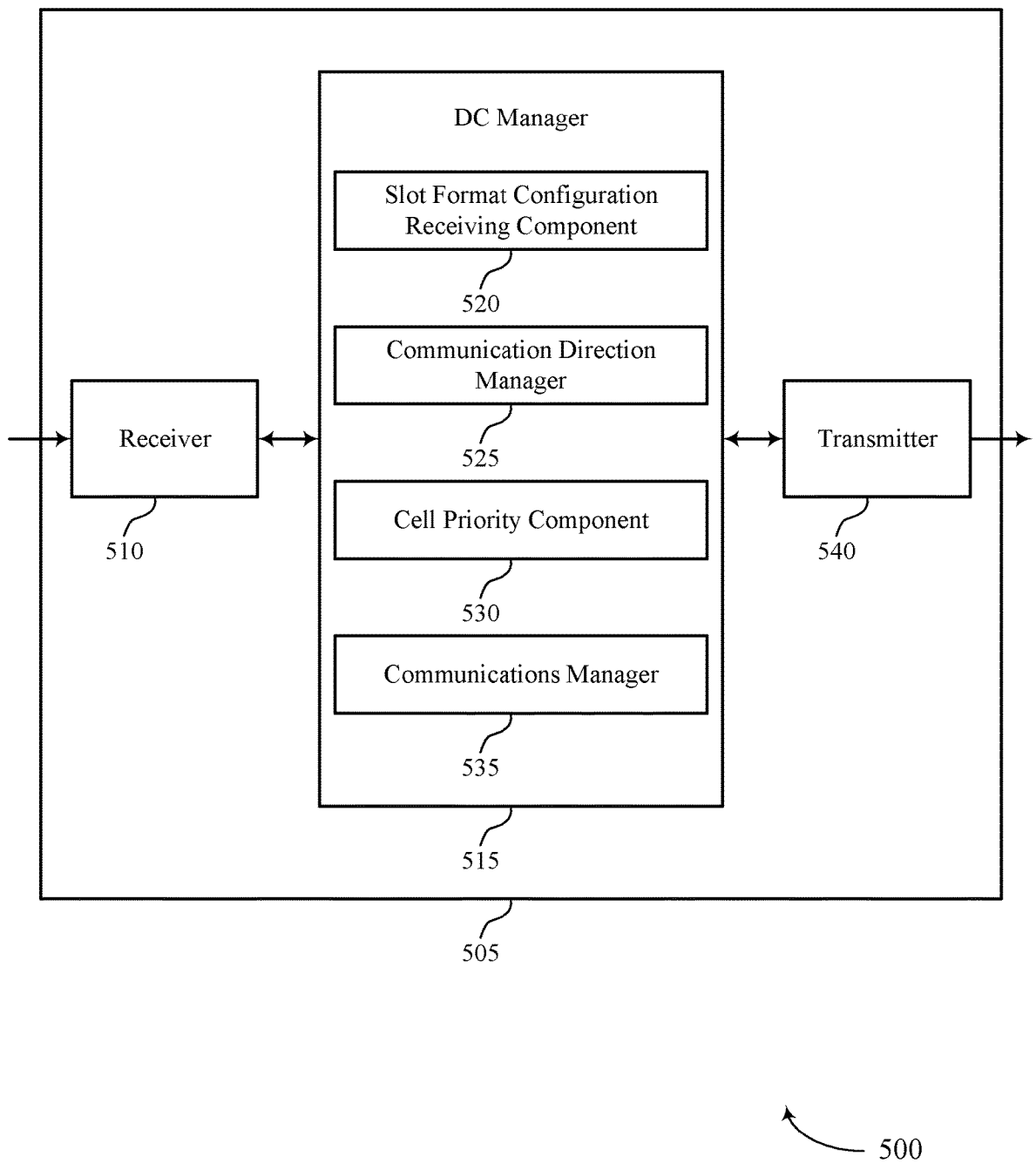

FIG. 5 shows a block diagram 500 of a device 505 that supports half-duplex operation in DC in accordance with aspects of the present disclosure. The device 505 may be an example of aspects of a device 405, or a UE 115 as described herein. The device 505 may include a receiver 510, a DC manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to half-duplex operation in DC, etc.). Information may be passed on to other components of the device 505. The receiver 510 may be an example of aspects of the transceiver 720 described with reference to FIG. 7. The receiver 510 may utilize a single antenna or a set of antennas.

The DC manager 515 may be an example of aspects of the DC manager 415 as described herein. The DC manager 515 may include a slot format configuration receiving component 520, a communication direction manager 525, a cell priority component 530, and a communications manager 535. The DC manager 515 may be an example of aspects of the DC manager 710 described herein.

The slot format configuration receiving component 520 may receive a first slot format configuration for a first cell and a second slot format configuration for a second cell, the first cell being associated with a first RAT and a first RF spectrum band and the second cell being associated with a second RAT and a second RF spectrum band.

The communication direction manager 525 may identify, for at least a portion of a TTI, a conflict between a first communication direction on the first RF spectrum band for the first cell and a second communication direction on the second RF spectrum band for the second cell.

The cell priority component 530 may determine, in response to the identified conflict, that the first cell has a priority over the second cell, where the priority is determined based on the first slot format configuration and the second slot format configuration, or the first RF spectrum band and the second RF spectrum band, or a combination thereof.

The communications manager 535 may communicate, during the at least the portion of the TTI, on the first cell in the first communication direction based on the first cell having the priority over the second cell.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

A processor of a UE 115 (e.g., controlling the receiver 510, the transmitter 540, or the transceiver 720 as described with reference to FIG. 7) may increase communication reliability and accuracy by supporting prioritization of conflicting communications, which may increase reliability and reduce latency (e.g., via implementation of system components described with reference to FIG. 6). Further, the processor of the UE 115 may identify one or more aspects of a prioritization scheme (e.g., one or more cell or communication priorities) to perform the processes described herein. The processor of the UE 115 may identify a cell priority, which may save power and increase battery life at the UE 115 (e.g., by implementing reducing interference between conflicting communications at the UE 115).

Figure 6:
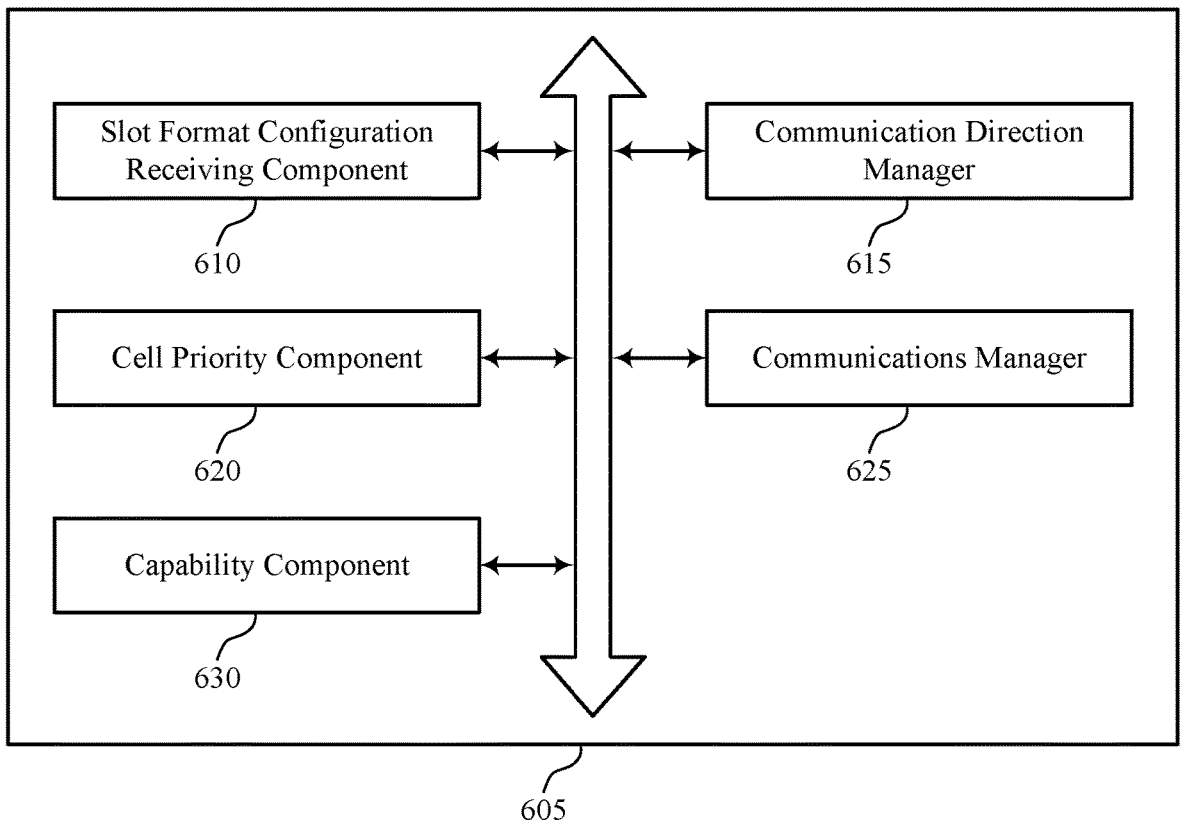
FIG. 6 shows a block diagram of a DC manager that supports half-duplex operation in DC in accordance with aspects of the present disclosure.

FIG. 6 shows a block diagram 600 of a DC manager 605 that supports half-duplex operation in DC in accordance with aspects of the present disclosure. The DC manager 605 may be an example of aspects of a DC manager 415, a DC manager 515, or a DC manager 710 described herein. The DC manager 605 may include a slot format configuration receiving component 610, a communication direction manager 615, a cell priority component 620, a communications manager 625, and a capability component 630. Each of these modules may communicate, directly or indirectly, with one another (e.g., via one or more buses).

The slot format configuration receiving component 610 may receive a first slot format configuration for a first cell and a second slot format configuration for a second cell, the first cell being associated with a first RAT and a first RF spectrum band and the second cell being associated with a second RAT and a second RF spectrum band. In some cases, the UE is a type 1 UE for power control or a type 2 UE for power control. In some cases, the first RAT is an E-UTRA RAT, and the second RAT is an NR RAT. Alternatively, the first RAT may be an NR RAT and the second RAT may be an E-UTRA RAT.

In some examples, the slot format configuration receiving component 610 may identify, for the at least the portion of the TTI, one or more flexible symbols for the first cell based on the first slot format configuration. In some examples, the slot format configuration receiving component 610 may identify, for the at least the portion of the TTI, one or more flexible symbols for the second cell based on the second slot format configuration. In some cases, one or more flexible symbols include a guard period.

The communication direction manager 615 may identify, for at least a portion of a TTI, a conflict between a first communication direction on the first RF spectrum band for the first cell and a second communication direction on the second RF spectrum band for the second cell. In some examples, the communication direction manager 615 may determine the first communication direction for the at least the portion of the TTI based on the first slot format configuration. In some examples, the communication direction manager 615 may determine the second communication direction for the at least the portion of the TTI based on the second slot format configuration.

In some examples, the communication direction manager 615 may determine the second communication direction for the at least the portion of the TTI based on the one or more flexible symbols for the first cell. In some examples, the communication direction manager 615 may determine the first communication direction for the at least the portion of the TTI based on the one or more flexible symbols for the second cell. In some cases, the first communication direction is semi-statically configured. In some cases, the second communication direction is configured via RRC signaling, or DCI, or a semi-static SFI, or a combination thereof. Additionally or alternatively, the first communication direction is configured via RRC signaling or a semi-static SFI, or a combination thereof. Additionally, the second communication direction may be semi-statically configured.

The cell priority component 620 may determine, in response to the identified conflict, that the first cell has a priority over the second cell, where the priority is determined based on the first slot format configuration and the second slot format configuration, or the first RF spectrum band and the second RF spectrum band, or a combination thereof. In some examples, the cell priority component 620 may drop, during the at least the portion of the TTI, a communication on the second cell in the second communication direction based on the identified conflict. In some cases, the first communication direction is dynamically configured, and the dropping is based on the dynamically configured first communication direction.

In some examples, the cell priority component 620 may determine the priority based on whether the first RF spectrum band and the second RF spectrum band include a same RF spectrum band or different RF spectrum bands. In some examples, the cell priority component 620 may determine the priority based on a separation in frequency between the first RF spectrum band and the second RF spectrum band. In some examples, the cell priority component 620 may determine the priority based on one or more harmonic frequencies for the first RF spectrum band or the second RF spectrum band. In some examples, the cell priority component 620 may determine that the first cell has the priority over the second cell based on the first RF spectrum band and the second RF spectrum band.

The communications manager 625 may communicate, during the at least the portion of the TTI, on the first cell in the first communication direction based on the first cell having the priority over the second cell. In some cases, at least one of the first cell or the second cell operate using TDD. In some cases, the first cell and the second cell are synchronized. In some cases, the first cell includes a reference cell and the second cell includes another cell. In some cases, the reference cell includes an MCG of a DC configuration including the other cell, and the other cell includes an SCG of the DC configuration.

The capability component 630 may determine a capability of the UE to support half-duplex communications based on the first RF spectrum band and the second RF spectrum band. In some examples, the capability component 630 may transmit, to a base station, an indication of the capability to support half-duplex communications.

Figure 7:
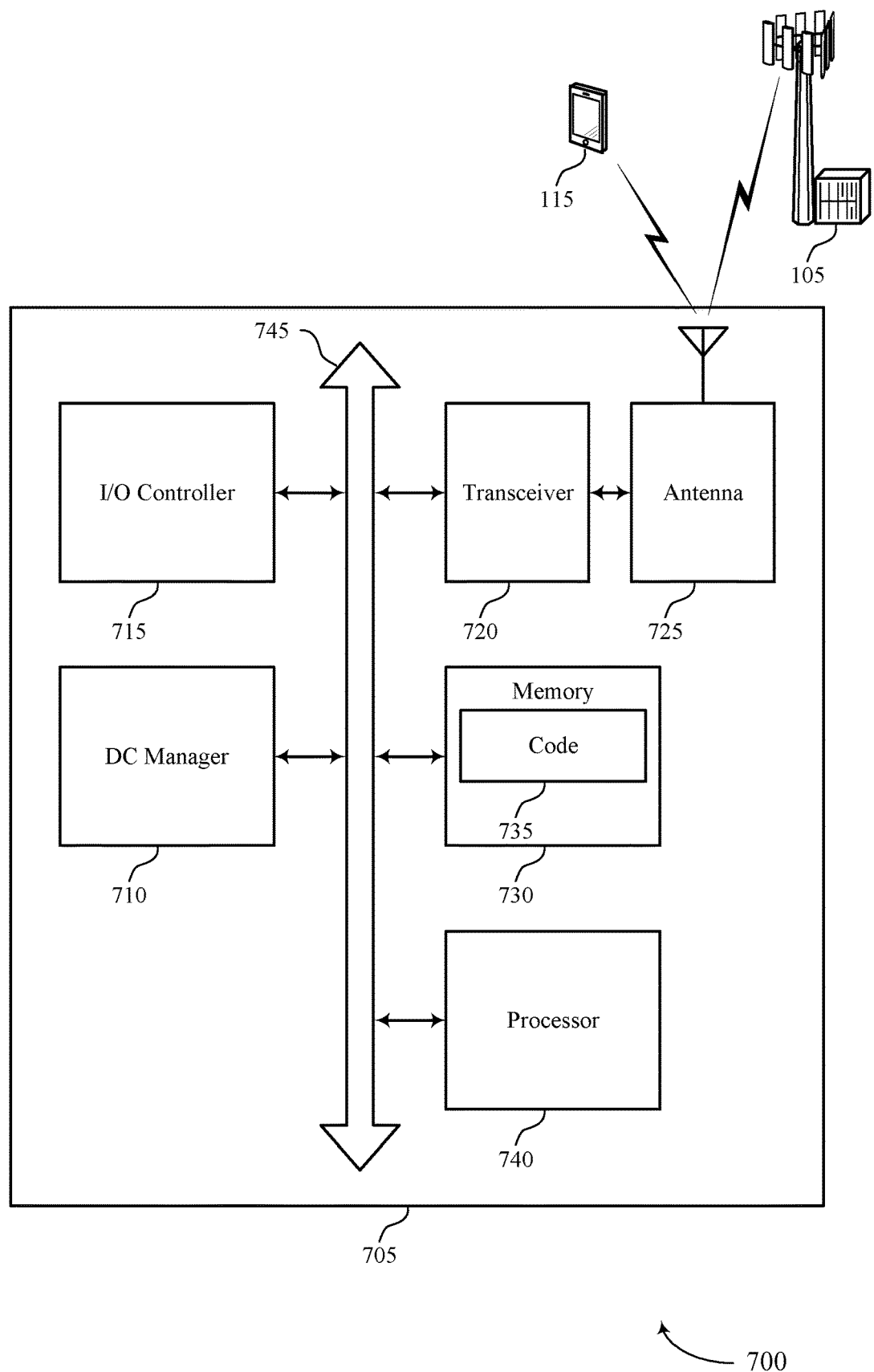
FIG. 7 shows a diagram of a system including a device that supports half-duplex operation in DC in accordance with aspects of the present disclosure.

FIG. 7 shows a diagram of a system 700 including a device 705 that supports half-duplex operation in DC in accordance with aspects of the present disclosure. The device 705 may be an example of or include the components of device 405, device 505, or a UE 115 as described herein. The device 705 may include components for bi-directional voice and data communications including components for transmitting and receiving communications, including a DC manager 710, an I/O controller 715, a transceiver 720, an antenna 725, memory 730, and a processor 740. These components may be in electronic communication via one or more buses (e.g., bus 745).

The DC manager 710 may receive a first slot format configuration for a first cell and a second slot format configuration for a second cell, the first cell being associated with a first RAT and a first RF spectrum band and the second cell being associated with a second RAT and a second RF spectrum band, identify, for at least a portion of a TTI, a conflict between a first communication direction on the first RF spectrum band for the first cell and a second communication direction on the second RF spectrum band for the second cell, determine, in response to the identified conflict, that the first cell has a priority over the second cell, where the priority is determined based on the first slot format configuration and the second slot format configuration, or the first RF spectrum band and the second RF spectrum band, or a combination thereof, and communicate, during the at least the portion of the TTI, on the first cell in the first communication direction based on the first cell having the priority over the second cell.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the wireless device may include a single antenna 725. However, in some cases the device may have more than one antenna 725, which may be capable of concurrently transmitting or receiving multiple wireless transmissions.

The memory 730 may include random access memory (RAM) and read only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting half-duplex operation in DC).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
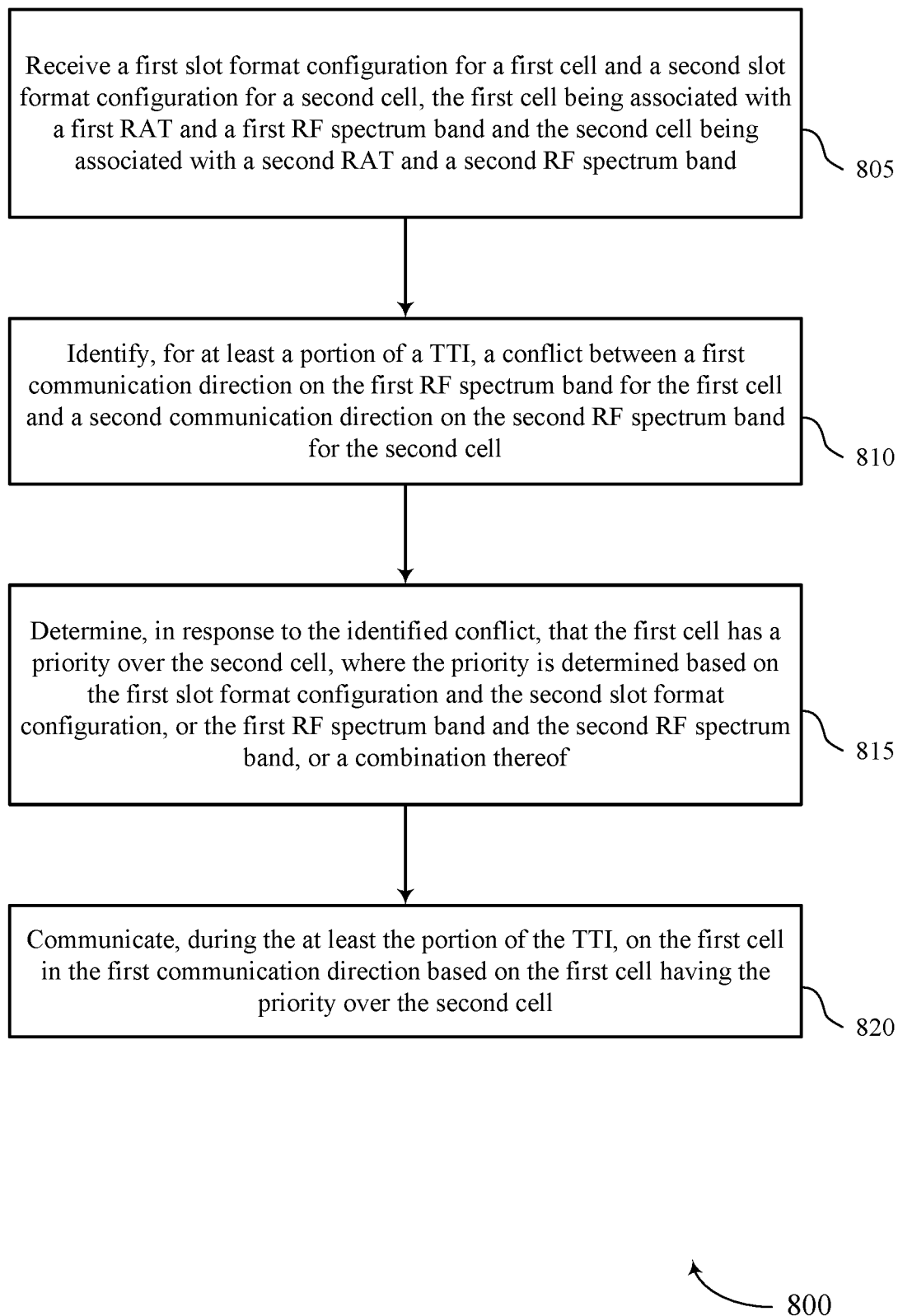
FIGS. 8 through 10 show flowcharts illustrating methods that support half-duplex operation in DC in accordance with aspects of the present disclosure.

FIG. 8 shows a flowchart illustrating a method 800 that supports half-duplex operation in DC in accordance with aspects of the present disclosure. The operations of method 800 may be implemented by a UE 115 or its components as described herein. For example, the operations of method 800 may be performed by a DC manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 805, the UE may receive a first slot format configuration for a first cell and a second slot format configuration for a second cell, the first cell being associated with a first RAT and a first RF spectrum band and the second cell being associated with a second RAT and a second RF spectrum band. The operations of 805 may be performed according to the methods described herein. In some examples, aspects of the operations of 805 may be performed by a slot format configuration receiving component as described with reference to FIGS. 4 through 7.

At 810, the UE may identify, for at least a portion of a TTI, a conflict between a first communication direction on the first RF spectrum band for the first cell and a second communication direction on the second RF spectrum band for the second cell. The operations of 810 may be performed according to the methods described herein. In some examples, aspects of the operations of 810 may be performed by a communication direction manager as described with reference to FIGS. 4 through 7.

At 815, the UE may determine, in response to the identified conflict, that the first cell has a priority over the second cell, where the priority is determined based on the first slot format configuration and the second slot format configuration, or the first RF spectrum band and the second RF spectrum band, or a combination thereof. The operations of 815 may be performed according to the methods described herein. In some examples, aspects of the operations of 815 may be performed by a cell priority component as described with reference to FIGS. 4 through 7.

At 820, the UE may communicate, during the at least the portion of the TTI, on the first cell in the first communication direction based on the first cell having the priority over the second cell. The operations of 820 may be performed according to the methods described herein. In some examples, aspects of the operations of 820 may be performed by a communications manager as described with reference to FIGS. 4 through 7.

Figure 9:
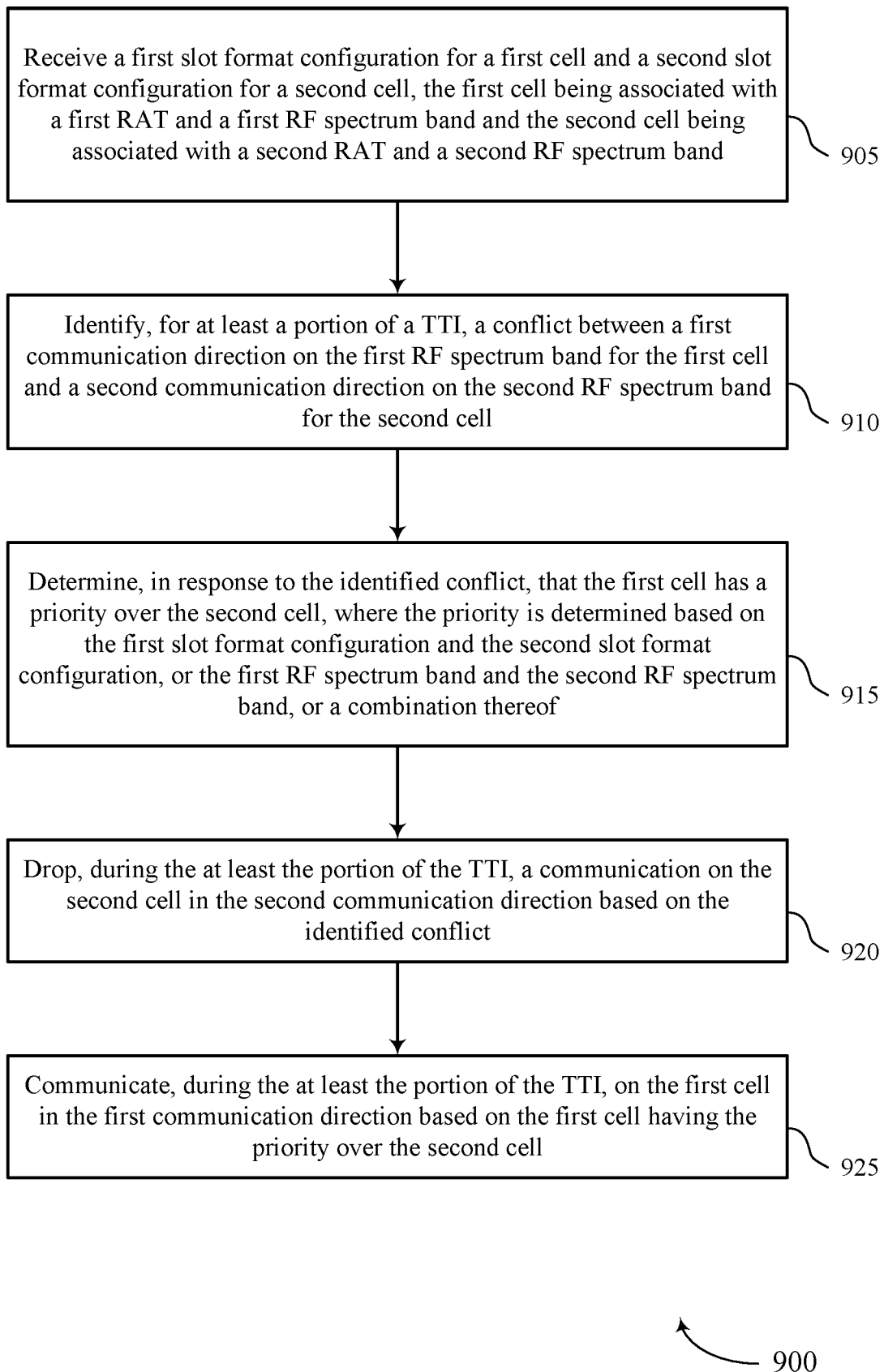

FIG. 9 shows a flowchart illustrating a method 900 that supports half-duplex operation in DC in accordance with aspects of the present disclosure. The operations of method 900 may be implemented by a UE 115 or its components as described herein. For example, the operations of method 900 may be performed by a DC manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 905, the UE may receive a first slot format configuration for a first cell and a second slot format configuration for a second cell, the first cell being associated with a first RAT and a first RF spectrum band and the second cell being associated with a second RAT and a second RF spectrum band. The operations of 905 may be performed according to the methods described herein. In some examples, aspects of the operations of 905 may be performed by a slot format configuration receiving component as described with reference to FIGS. 4 through 7.

At 910, the UE may identify, for at least a portion of a TTI, a conflict between a first communication direction on the first RF spectrum band for the first cell and a second communication direction on the second RF spectrum band for the second cell. The operations of 910 may be performed according to the methods described herein. In some examples, aspects of the operations of 910 may be performed by a communication direction manager as described with reference to FIGS. 4 through 7.

At 915, the UE may determine, in response to the identified conflict, that the first cell has a priority over the second cell, where the priority is determined based on the first slot format configuration and the second slot format configuration, or the first RF spectrum band and the second RF spectrum band, or a combination thereof. The operations of 915 may be performed according to the methods described herein. In some examples, aspects of the operations of 915 may be performed by a cell priority component as described with reference to FIGS. 4 through 7.

At 920, the UE may drop, during the at least the portion of the TTI, a communication on the second cell in the second communication direction based on the identified conflict. The operations of 920 may be performed according to the methods described herein. In some examples, aspects of the operations of 920 may be performed by a cell priority component as described with reference to FIGS. 4 through 7.

At 925, the UE may communicate, during the at least the portion of the TTI, on the first cell in the first communication direction based on the first cell having the priority over the second cell. The operations of 925 may be performed according to the methods described herein. In some examples, aspects of the operations of 925 may be performed by a communications manager as described with reference to FIGS. 4 through 7.

Figure 10:
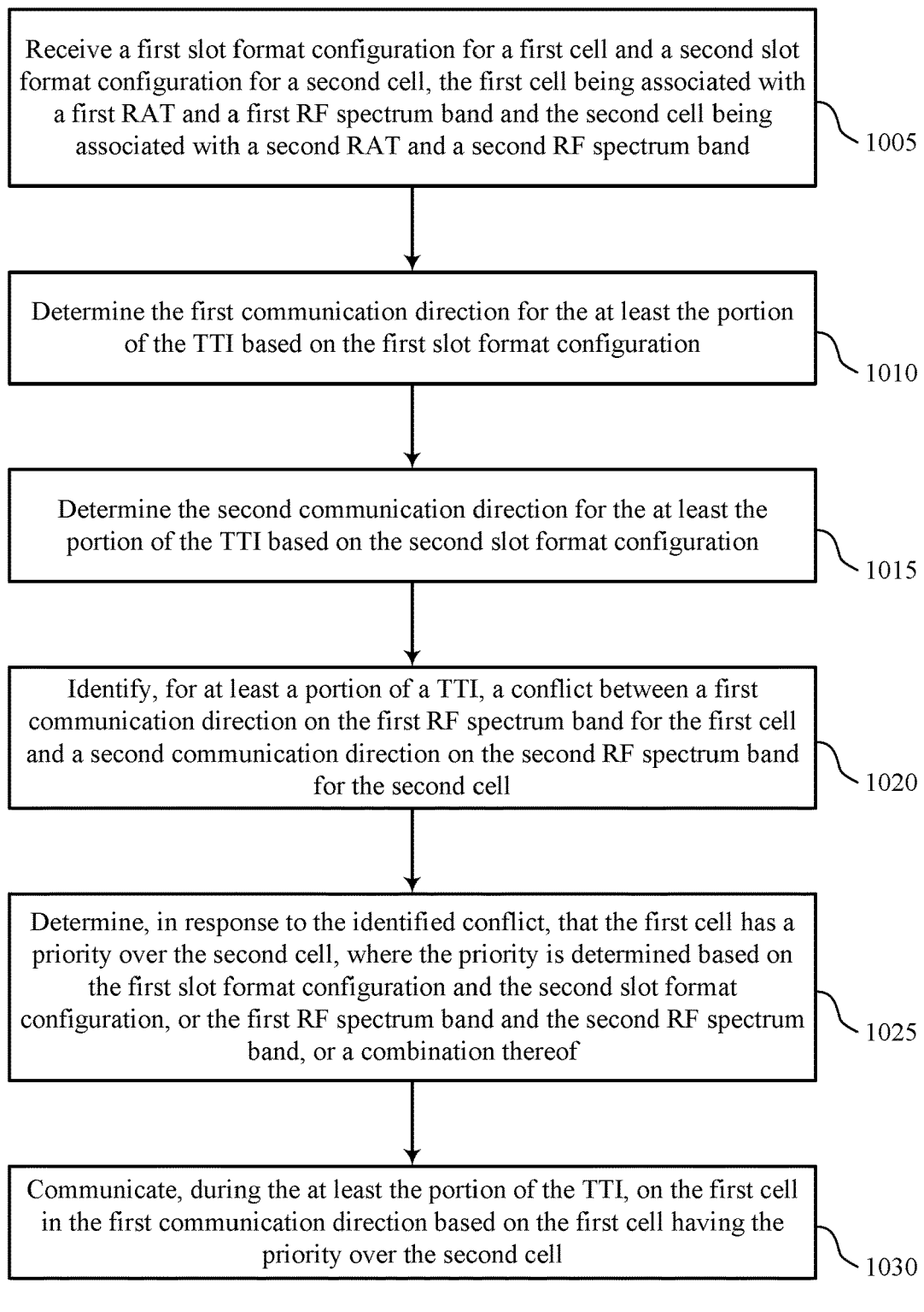

FIG. 10 shows a flowchart illustrating a method 1000 that supports half-duplex operation in DC in accordance with aspects of the present disclosure. The operations of method 1000 may be implemented by a UE 115 or its components as described herein. For example, the operations of method 1000 may be performed by a DC manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1005, the UE may receive a first slot format configuration for a first cell and a second slot format configuration for a second cell, the first cell being associated with a first RAT and a first RF spectrum band and the second cell being associated with a second RAT and a second RF spectrum band. The operations of 1005 may be performed according to the methods described herein. In some examples, aspects of the operations of 1005 may be performed by a slot format configuration receiving component as described with reference to FIGS. 4 through 7.

At 1010, the UE may determine the first communication direction for the at least the portion of the TTI based on the first slot format configuration. The operations of 1010 may be performed according to the methods described herein. In some examples, aspects of the operations of 1010 may be performed by a communication direction manager as described with reference to FIGS. 4 through 7.

At 1015, the UE may determine the second communication direction for the at least the portion of the TTI based on the second slot format configuration. The operations of 1015 may be performed according to the methods described herein. In some examples, aspects of the operations of 1015 may be performed by a communication direction manager as described with reference to FIGS. 4 through 7.

At 1020, the UE may identify, for at least a portion of a TTI, a conflict between a first communication direction on the first RF spectrum band for the first cell and a second communication direction on the second RF spectrum band for the second cell. The operations of 1020 may be performed according to the methods described herein. In some examples, aspects of the operations of 1020 may be performed by a communication direction manager as described with reference to FIGS. 4 through 7.

At 1025, the UE may determine, in response to the identified conflict, that the first cell has a priority over the second cell, where the priority is determined based on the first slot format configuration and the second slot format configuration, or the first RF spectrum band and the second RF spectrum band, or a combination thereof. The operations of 1025 may be performed according to the methods described herein. In some examples, aspects of the operations of 1025 may be performed by a cell priority component as described with reference to FIGS. 4 through 7.

At 1030, the UE may communicate, during the at least the portion of the TTI, on the first cell in the first communication direction based on the first cell having the priority over the second cell. The operations of 1030 may be performed according to the methods described herein. In some examples, aspects of the operations of 1030 may be performed by a communications manager as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    operating in accordance with a dual connectivity configuration, wherein operating in accordance with the dual connectivity configuration is based at least in part on establishing communications with a first cell associated with a first frequency band and a second cell associated with a second frequency band;
    receiving, based at least in part on operating in accordance with the dual connectivity configuration, a first slot format configuration for the first cell and a second slot format configuration for the second cell;
    identifying, for at least a portion of a transmission time interval (TTI) and based at least in part on the first slot format configuration for the first cell, a conflict for communications scheduled for the UE, the conflict between a first communication direction for the UE via the first cell and a second communication direction for the UE via the second cell; and
    communicating, during the at least the portion of the TTI and based at least in part on the first slot format configuration, via the first cell based at least in part on the first cell having priority over the second cell.

2. The method of claim 1, wherein the UE is configured to implement conflict resolution for directional communications between the first cell and the second cell.

3. The method of claim 1, further comprising:
    determining that the first cell has priority over the second cell based at least in part on the first communication direction and the second communication direction.

4. The method of claim 1, further comprising:
    dropping, during the at least the portion of the TTI, a communication via the second cell based at least in part on the first communication direction being downlink and the second communication direction being uplink for the at least the portion of the TTI, wherein the first communication direction being downlink is based at least in part on the first slot format configuration for the first cell.

5. The method of claim 1, further comprising:
    dropping, during the at least the portion of the TTI, a communication via the second cell based at least in part on the first communication direction being uplink and the second communication direction being downlink for the at least the portion of the TTI, wherein the first communication direction is based at least in part on the first slot format configuration for the first cell.

6. The method of claim 1, further comprising:
    determining that the first cell has priority over the second cell based at least in part on the first cell being a reference cell, wherein communicating with the first cell during the at least the portion of the TTI is based at least in part on determining that the first cell is the reference cell.

7. The method of claim 6, wherein determining that the first cell has priority over the second cell comprises:
    determining the priority based at least in part on whether the first frequency band and the second frequency band comprise a same frequency band or different frequency bands.

8. The method of claim 6, wherein determining that the first cell has priority over the second cell comprises:
    determining the priority based at least in part on a separation in frequency between the first frequency band and the second frequency band.

9. The method of claim 1, further comprising:
    transmitting an indication of a capability of the UE to support half-duplex communications, wherein identifying the conflict is based at least in part on the capability of the UE to support half-duplex communications.

10. The method of claim 1, further comprising:
    determining the first communication direction based at least in part on the first slot format configuration for the first cell.

11. The method of claim 10, wherein the second communication direction is configured via radio resource control (RRC) signaling, or a semi-static slot format indicator (SFI), or a combination thereof.

12. The method of claim 11, wherein:
    the UE is a type 1 UE for power control or a type 2 UE for power control; and
    a first radio access technology (RAT) associated with the first cell is an evolved universal terrestrial radio access (E-UTRA) RAT and a second RAT associated with the second cell is a new radio (NR) RAT.

13. The method of claim 10, wherein the second communication direction is semi-statically configured.

14. The method of claim 13, wherein:
    the UE is a type 1 UE for power control or a type 2 UE for power control; and
    a first radio access technology (RAT) associated with the first cell is a new radio (NR) RAT and a second RAT associated with the second cell is an evolved universal terrestrial radio access (E-UTRA) RAT.

15. The method of claim 10, wherein:
    the first communication direction is dynamically configured and a communication on the second cell in the second communication direction is dropped based at least in part on the first communication direction; and
    the second communication direction is semi-statically configured.

16. The method of claim 1, further comprising:
    identifying, for the at least the portion of the TTI, one or more flexible symbols for the second cell; and
    determining the second communication direction for the at least the portion of the TTI based at least in part on the one or more flexible symbols for the second cell.

17. The method of claim 1, wherein the UE communicates with the first cell, the second cell, or both, using half-duplex communications.

18. The method of claim 1, wherein the first frequency band is a same frequency band as the second frequency band.

19. The method of claim 1, wherein at least one of the first cell or the second cell operate using time division duplexing (TDD).

20. The method of claim 1, wherein the first cell and the second cell are synchronized.

21. The method of claim 1, wherein the second cell is another cell different from the first cell.

22. The method of claim 21, wherein the first cell comprises a master cell group (MCG) of Rail the dual connectivity configuration, and the second cell comprises a secondary cell group (SCG) of the dual connectivity configuration.

23. An apparatus for wireless communication at a user equipment (UE), comprising:
a processor;
memory coupled with the processor; and
a transceiver configured to:
operate in accordance with a dual connectivity configuration, wherein operating in accordance with the dual connectivity configuration is based at least in part on establishing communications with a first cell associated with a first frequency band and a second cell associated with a second frequency band;
receive, based at least in part on operating in accordance with the dual connectivity configuration, a first slot format configuration for the first cell and a second slot format configuration for the second cell; and
instructions stored in the memory and executable by the processor to cause the apparatus to:
identify, for at least a portion of a transmission time interval (TTI) and based at least in part on the first slot format configuration for the first cell, a conflict for communications scheduled for the UE, the conflict between a first communication direction for the UE via the first cell and a second communication direction for the UE via the second cell; and
communicate, during the at least the portion of the TTI and based at least in part on the first slot format configuration, via the first cell based at least in part on the first cell having priority over the second cell.

24. The apparatus of claim 23, wherein the UE is configured to implement conflict resolution for directional communications between the first cell and the second cell.

25. The apparatus of claim 23, wherein the instructions are further executable by the processor to cause the apparatus to:
determine that the first cell has priority over the second cell based at least in part on the first communication direction and the second communication direction.

26. The apparatus of claim 23, wherein the instructions are further executable by the processor to cause the apparatus to:
drop, during the at least the portion of the TTI, a communication via the second cell based at least in part on the first communication direction being downlink and the second communication direction being uplink for the at least the portion of the TTI, wherein the first communication direction being downlink is based at least in part on the first slot format configuration for the first cell.

27. The apparatus of claim 23, wherein the instructions are further executable by the processor to cause the apparatus to:
drop, during the at least the portion of the TTI, a communication via the second cell based at least in part on the first communication direction being uplink and the second communication direction being downlink for the at least the portion of the TTI, wherein the first communication direction is based at least in part on the first slot format configuration for the first cell.

28. The apparatus of claim 23, wherein the instructions are further executable by the processor to cause the apparatus to:
determine that the first cell has priority over the second cell based at least in part on the first cell being a reference cell, wherein communicating with the first cell during the at least the portion of the TTI is based at least in part on determining that the first cell is the reference cell.

29. An apparatus for wireless communication at a user equipment (UE), comprising:
means for operating in accordance with a dual connectivity configuration, wherein operating in accordance with the dual connectivity configuration is based at least in part on establishing communications with a first cell associated with a first frequency band and a second cell associated with a second frequency band;
means for receiving, based at least in part on operating in accordance with the dual connectivity configuration, a first slot format configuration for the first cell and a second slot format configuration for the second cell;
means for identifying, for at least a portion of a transmission time interval (TTI) and based at least in part on the first slot format configuration for the first cell, a conflict for communications scheduled for the UE, the conflict between a first communication direction for the UE via the first cell and a second communication direction for the UE via the second cell; and
means for communicating, during the at least the portion of the TTI and based at least in part on the first slot format configuration, via the first cell based at least in part on the first cell having priority over the second cell.

30. A non-transitory computer-readable medium storing code for wireless communication at a user equipment (UE), the code comprising instructions executable by a processor to:
operate in accordance with a dual connectivity configuration, wherein operating in accordance with the dual connectivity configuration is based at least in part on establishing communications with a first cell associated with a first frequency band and a second cell associated with a second frequency band;
receive, based at least in part on operating in accordance with the dual connectivity configuration, a first slot format configuration for the first cell and a second slot format configuration for the second cell;
identify, for at least a portion of a transmission time interval (TTI) and based at least in part on the first slot format configuration for the first cell, a conflict for communications scheduled for the UE, the conflict between a first communication direction for the UE via the first cell and a second communication direction for the UE via the second cell; and
communicate, during the at least the portion of the TTI and based at least in part on the first slot format configuration, via the first cell based at least in part on the first cell having priority over the second cell.

* * * * *